United States Patent [19]

Powell et al.

[11] Patent Number: 4,694,172

[45] Date of Patent: Sep. 15, 1987

[54] DETECTION OF FIRES AND EXPLOSIONS

[75] Inventors: Brian D. Powell, Maidenhead; David J. Spring, Slough, both of England

[73] Assignee: Graviner Limited, Buckinghamshire, England

[21] Appl. No.: 786,915

[22] Filed: Oct. 11, 1985

[30] Foreign Application Priority Data

Oct. 13, 1984 [GB] United Kingdom ............... 8425933

[51] Int. Cl.$^4$ ........................... G01C 3/08; G01J 5/26
[52] U.S. Cl. .................................. 250/339; 250/342; 250/349; 356/4
[58] Field of Search ............... 250/339, 342, 349, 372; 356/4; 374/6

[56] References Cited

U.S. PATENT DOCUMENTS

| | | | |
|---|---|---|---|
| 3,056,958 | 10/1962 | Anderson | 343/462 |
| 4,179,606 | 12/1979 | Nakauchi et al. | 250/339 |
| 4,296,324 | 10/1981 | Kern et al. | 250/339 |
| 4,529,317 | 7/1985 | Cramp | 356/407 |

Primary Examiner—Janice A. Howell
Assistant Examiner—Constantine Hannaher
Attorney, Agent, or Firm—Leydig, Voit & Mayer

[57] ABSTRACT

A radiation-responsive system is described for measuring the distance to a fire. A radiation detector produces an output I1 dependent on the intensity of radiation received in a narrow wavelength band where there is insignificant atmospheric absorption while another detector produces an output I2 dependent on the intensity received in a narrow wavelength band where there is significant atmospheric absorption. The ratio I1/I2 will thus be dependent on the distance to the fire because each of the terms will be equally affected by the normal square law decrease of intensity with distance, but the term I2 will decrease as the distance increases. A ratio unit measures the ratio I1/I2 which is converted into digital form and passed to a processing unit. The latter is programmed according to the precise form of the relationship between I1/I2 and distance to produce an output proportional to distance.

10 Claims, 3 Drawing Figures

DETECTION OF FIRES AND EXPLOSIONS

BACKGROUND OF THE INVENTION

The invention relates to the detections of fires and explosions (referred to below generically as "fires"), and more particularly to methods and arangments for producing outputs dependent on the distance of a fire and/or its size. Embodiments of the invention to be described operate in dependence on radiation emitted by the fire.

SUMMARY OF THE INVENTION

According to the invention, there is provided a system for producing an output dependent on the distance to a source of radiation, comprising comparing means operative to compare the electromagnetic radiation received at two different wavelengths, at one of which the received radiation is significantly absorbed by the ambient atmosphere and at the other of which there is relatively insignificant such absorption, whereby to produce a distance-dependent output.

According to the invention, there is also provided a method of measuring the distance to a source of radiation, including the steps of measuring the radiation received in first and second spaced apart narrow wavelength bands, the first of which encompasses a wavelength at which radiation from the said source is significantly absorbed by the ambient atmosphere and the second of which encompasses a wavelength at which there is insignificant such absorption, and measuring the ratio between the two intensities whereby to produce a distance-dependent output dependent on the said distance.

DESCRIPTION OF THE DRAWINGS

Systems responsive to the distance of a fire, and to its intensity and size, will now be described, by way of example only, with reference to the accompanying drawings in which.

DESCRIPTION OF PREFERRED EMBODIMENTS

The forms of apparatus to be described operate by sensing radiation emitted from the fire. Intensity of such radiation, as received by a radiation detector, will depend on the intensity of the radiation emitted by the fire, its size, and the distance between the fire and the detector. Clearly, therefore, it is not possible to measure the distance between a fire and a detector by simple measurement of the intensity received at the detector.

In the apparatus to be described, the radiation emitted by the fire is measured simultaneously at two different wavelengths (or in two different narrow wavelength bands), one of which wavelength bands is centred at a wavelength at which radiation is absorbed by the atmosphere between the detector and the fire and the other of which bands is centred at a wavelength at which substantially no such absorption takes place. If $I1$ is the intensity of the radiation received in the wavelength band where there is substantially no absorption and $I2$ is the intensity of the radiation received in the wavelength band where substantial absorption takes place, the apparatus is arranged to compare the two intensities, such as by measuring the ratio $I1/I2$. It will be apparent that this ratio will increase as the distance between the fire and the detection point increases. This is because the term $I2$ will decrease with increasing distance, owing to the fact that the greater path length will cause greater absorption. Each term $I1$, $I2$, will of course decrease with increasing distance because of the inverse square law relationship distance between the intensity received from a source of radiation and the distance of the source from the detecting point. However, because this affects both terms, the overall effect of it will be zero. It will be appreciated that the term $I1$ may not be completely unaffected by absorption, even though the corresponding wavelength band is specifically selected so as to minimise absorption. Because of this and other factors, the relationship between $I1/I2$ and the distance may not be a simple linear relationship. Experimental determination has shown that under certain circumstances it may, for example, have the form $$(I1/I2) = A + Bx \qquad (1)$$

where A and B are constants and x is the distance between the source and the detecting point.

However, it may have other forms. In particular, it may have an exponential form. Provided, however, that its form is known, the relationship may be used to provide a determination of the distance between the fire and the detecting point.

Figure 1:
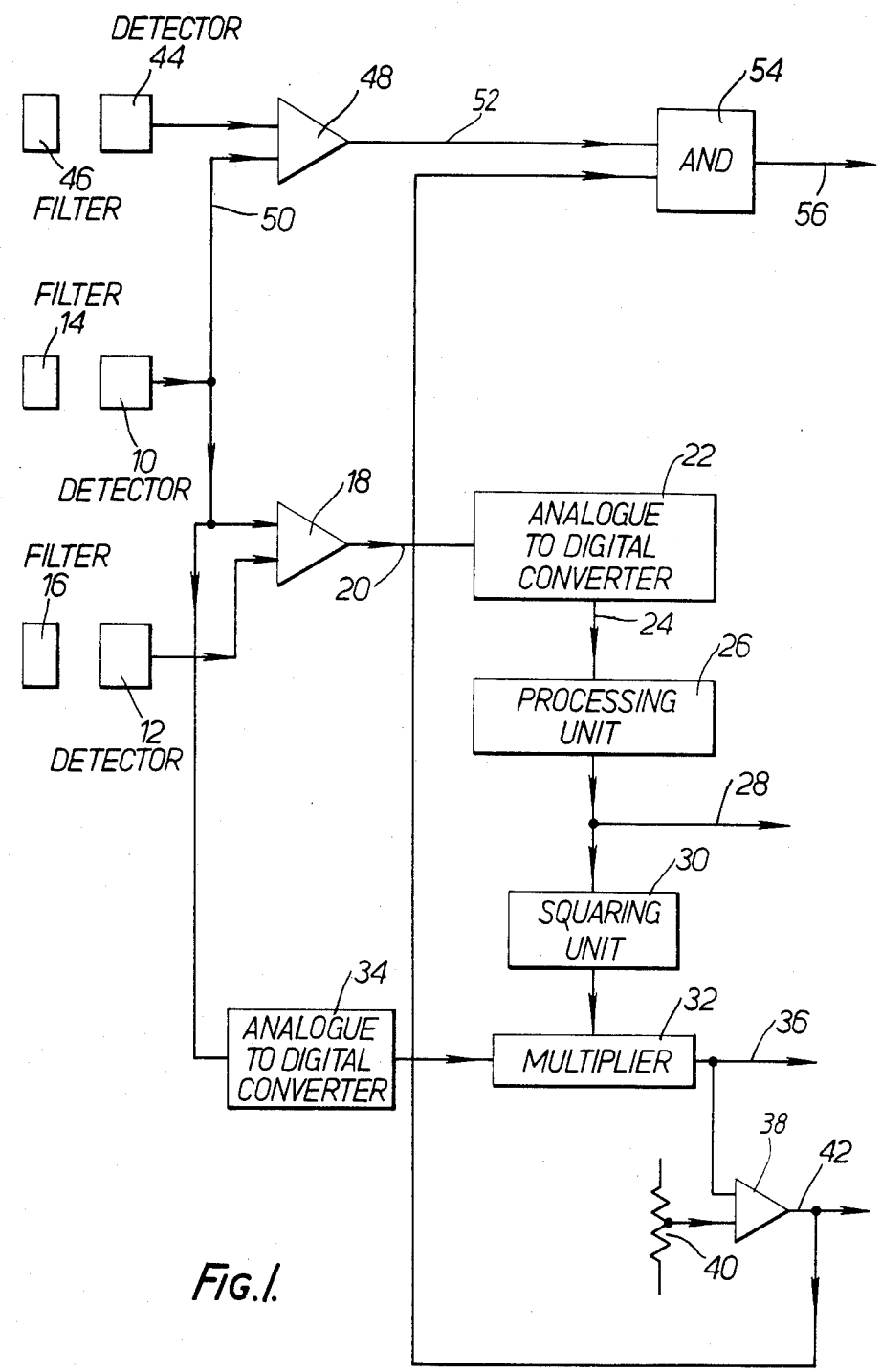
FIG. 1 is a block circuit diagram of one of the systems.

FIG. 1 shows one form which a system can take.

As shown, the system has radiation detectors 10 and 12 which view the area where the fire is expected through respective radiation filters 14 and 16. In this example, the system is designed particularly for detecting hydrocarbon fires.

Filter 14 is arranged to pass radiation to the detector 10 in a narrow wavelength band covering the range 4.35 to 4.6 microns, which are wavelengths at which the fire emits radiation and at which there is substantially no atmospheric absorption, while filter 16 is arranged to pass radiation to the detector 12 in a narrow band covering about 4.1 to 4.35 microns, which is a band at which radiation is absorbed by atmospheric carbon dioxide. Detectors 10 and 12 may, for example, be thermopile or pyroelectric detectors. Each detector produces a respective electrical output $I1$, $I2$, dependent on the magnitude of the radiation intensity which it receives. The outputs $I1$, $I2$ are passed to a ratio measuring unit 18 which produces an output on a line 20 dependent on the ratio $I1/I2$. An analogue to digital converter 22 converts this ratio output into digital form and the digital value is passed on a line 24 to a processing unit 26. The unit 26 processes the digital signal on line 24 to produce an output on a line 28 indicating the distance x between the fire and the detectors. The processing unit 26 must therefore operate in accordance with the relationship between $I1/I2$ and the distance x, for example according to Equation (1) above if that in fact represents the relationship. The processing unit 26 may take any suitable form. For example, it may be in the form of a microprocessor controlled by suitable software according to the particular relationship between the ratio $I1/I2$ and the distance x. Instead, however, it could take the form of a look-up table.

If the intensity of the fire itself is I0, it follows that $$I1 = C(I0/x^2)$$

where C is a constant. Therefore, $$I0 = (I1 \cdot x^2 / C) \qquad (2)$$

In accordance with the Equation (2), therefore, the apparatus of FIG. 1 can produce an output corresponding to I0. As indicated in FIG. 1, the digital output on line 28, representing the distance x, is passed to a squaring unit 30 and the resultant output, equal to $x^2$, is passed to one input of a multiplying unit 32. The other input of the unit 32 receives a signal corresponding to I1 via an analogue to digital converter 34. Therefore, the output of the multiplying unit 32, on a line 36 represents the intensity I0 of the fire itself. The output on line 36 can also be fed into one input of a comparator 38 whose other input receives a constant signal on a line 40. The comparator 38 will only produce an output on a line 42 if I0 exceeds a predetermined threshold. For a given type of fire, it will be appreciated that I0 is a measure of the size of the fire and the output on line 42 indicates that the fire is at least of a predetermined size.

The apparatus may be provided with a third radiation detector, detector 44, which receives radiation through a filter 46. The output I3 of detector 44, representing the intensity of the radiation received by the detector 44 in the wavelength band defined by the filter 46, is passed to one input of a comparator 48 whose other input receives the output I1 on a line 50. The comparator 48 thus compares the outputs I3 and I1 and only produces an output on a line 52 when the magnitude of I1 exceeds the magnitude of I3. The wavelength band defined by the filter 46 is selected so that any output on line 52 confirms the existence of a fire; radiation from sources other than a fire of the type to be detected (that is, "noise") does not produce an output on line 52. For example, filter 46 could define a narrow wavelength band centred at 1 micron. In the presence of a hydrocarbon fire, the radiation in the band 4.35 to 4.6 microns (the band defined by filter 14) will be considerably greater than the radiation at 1 micron, and an output will therefore be produced on line 52. However, if there is a noise source of radiation, for example radiation from the sun or from hot surfaces, the radiation at 1 micron will be proportionately greater, and no output will be produced on line 52.

Instead, however, the filter 46 could define a broad band centred at 4.4 microns (that is, substantially broader than the band of filter 14). Again, in the presence of a hydrocarbon fire, the comparator 48 will produce an output but not in response to a noise source of the type described.

The outputs on lines 42 and 52 may be fed into an AND gate 54 to produce a fire alarm signal on a line 56. The output on line 56 will thus be produced only when radiation from a fire of the type to be detected is present and the size of the fire exceeds the threshold defined by the signal on line 40. Therefore, the system discriminates against small fires close to the detectors and which are not required to give an alarm; for example, it would not produce an output on line 56 in response to the flame from a smokers' lighter—because the size of this flame will be too small to produce the output on line 42. However, it would produce an output on line 56 in response to a large fire (e.g. from a flare stack on an oil rig) even if at a great distance.

Clearly, if the detectors are such that their sensitivities vary with angle of view, the outputs produced will incur a reduction in accuracy as the angle of view changes.

Figure 2:
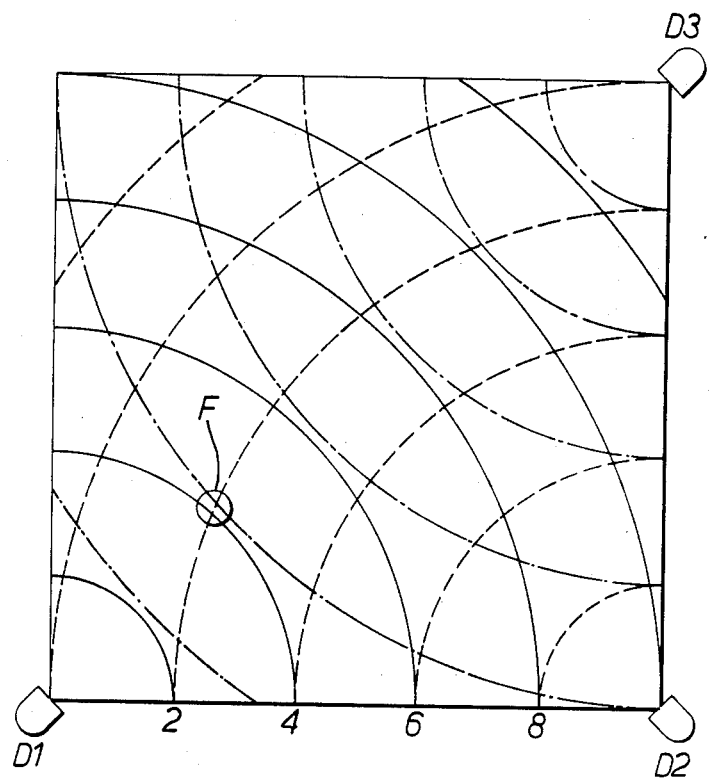
FIG. 2 shows how two or more of the systems of FIG. 1 may be used together to determine the position of a fire.

Two or more of the systems described with reference to FIG. 1 can be used to locate the position of a fire within a region being monitored. This is illustrated in FIG. 2 where D1 represents the detectors 10,12 of a system of the form illustrated in FIG. 1, while D2 and D3 represent the detectors 10, 12 of separate (and similar) such systems. The perpendicular axes in FIG. 2 represent distances in meters. Thus, if a fire exists at point F, system D1 will produce an output on its line 28 indicating the distance to the fire as being 4 meters while system D2 will produce a corresponding output indicating the distance as being 8 meters. These two distance outputs can be processed in any suitable way (such as by a microprocessor) to identify the position of the fire F. The distance output from system D3 provides confirmation of the position (though it will be appreciated that this is not essential).

The foregoing assumes that the fire F is of small physical extent in relation to the distances measured by the systems. However, if it was of significant physical extent, the distance outputs from the systems D1,D2 and D3 would indicate not only its position but also, at least approximately, its physical extent.

Figure 3:
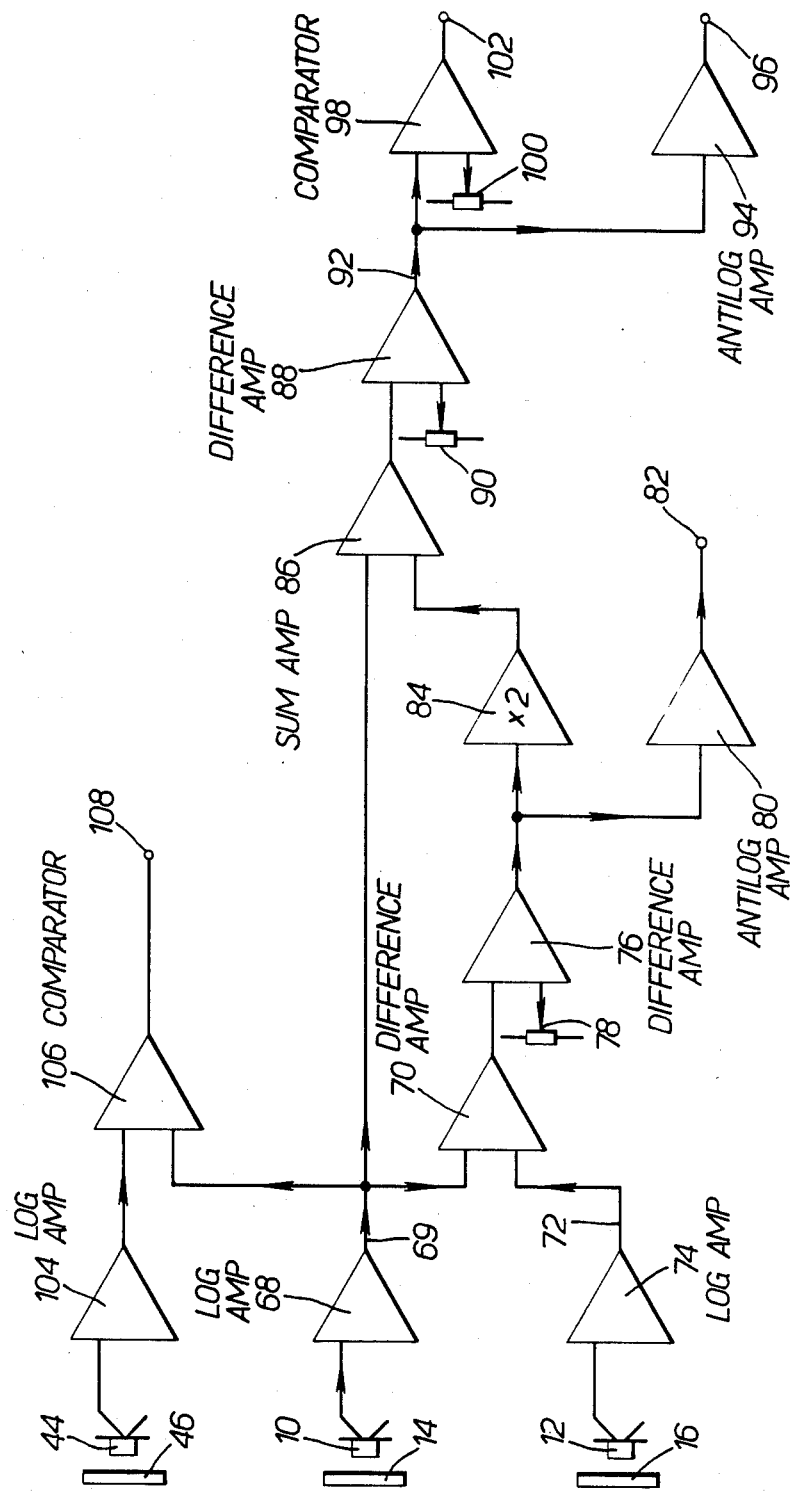
FIG. 3 is a schematic circuit diagram showing another form of the apparatus in greater detail.

FIG. 3 shows another system. The system of FIG. 3 corresponds to the system of FIG. 1 but is of analogue form. It is specifically designed on the assumption that the relationship between I1 and I2 is of the form shown by the Equation (1) above. The system of FIG. 3 has the three detectors 10, 12 and 44 of FIG. 1 and their associated filters 14, 16 and 46.

The output, I1, of detector 10 is passed through a logarithmic amplifier 68 to produce an output, log (I1), on a line 69 which is passed to one input of a differential amplifier 70. The other input of the amplifier 70 receives an output, log (I2), on a line 72 from a logarithmic amplifier 74 receiving the signal I2 from detector 12. The output from amplifier 70 is passed to one input of a second differential amplifier 76 whose second input receives a constant signal on a line 78. The output of amplifier 76 is passed to an anti-logarithmic amplifier 80 whose output feeds an output terminal 82.

Referring to Equation (1) it will therefore be apparent that the output on line 82 is a signal representing the distance x. The constant input on line 78 to the amplifier 76 accounts for the constants A and B.

The output from amplifier 76 (which will represent log (x)) is passed to a times-two amplifier 84 which feeds one input of a summing unit 86. The second input of the unit 86 receives the signal log (I1) from line 69. The sum output is fed to a differential amplifier 88 whose second input receives a constant signal on a line 90.

From Equation (2) above, it will be apparent that $$\log (I0) = \log (I1) + \log (x^2) - \log (C)$$

Therefore, the output from amplifier 88 on line 92 will be equal to log (I0). This is passed to an antilogarithmic amplifier 94 which thus produces an output, at a terminal 96, representing I0. The log (I0) output is also fed into one input of a comparator 98 whose other input receives a constant signal on a line 100. Comparator 98 therefore produces a signal at a terminal 102 provided that the actual intensity of the fire, I0, which, for a given fire type, can be equated to fire size, exceeds a predetermined threshold.

For providing confirmation of the presence of the fire to be detected, the output, I3, of detector 44 is fed to a logarithmic amplifier 104 and thence to one input of a comparator 106 whose second input receives the log (I1) output from amplifier 68. Comparator 106 operates in the same manner as comparator 48 in FIG. 1, so as to produce the fire confirmation signal at a terminal 108. The outputs at terminals 102 and 108 may be fed into an AND gate corresponding to the AND gate 54 of FIG. 1.

It will be appreciated that the circuit arrangement shown in FIG. 3 is merely one of various different forms which may be designed, in order to process the input signals from the detectors. The form of the circuit arrangement would of course be modified in order to suit the particular relationship between I1,I2 and the distance x.

We claim:

1. A system for producing an output dependent on the distance to a localised source whose temperature is substantially in excess of its ambient atmosphere and which emits corresponding electromagnetic radiation, comprising
   first detecting means having a wide field of view and operative to produce a first signal dependent on the electromagnetic radiation received at a first wavelength band at which the received radiation is significantly absorbed by the ambient atmosphere,
   second detecting means having a wide field of view and operative to produce a second signal dependent on the electromagnetic radiation received at a second wavelength band which is a discrete emission band corresponding to a band in which the localised source emits radiation and in which there is relatively insignificant absorption by the ambient atmosphere, and
   comparing means connected to compare the first and second signals so as to produce a distance-dependent output.

2. A system according to claim 1, in which the comparing means comprises means for measuring the ratio of the two said signals so as to measure the ratio of the intensities of the radiation respectively received at the two wavelength bands.

3. A system according to claim 1, including means connected to receive the said distance-dependent output and the said second signal, so as to produce an intensity output dependent on the intensity of the radiation emitted by the said source.

4. A system according to claim 3, including
   means establishing a predetermined threshold value, and
   means connected to compare the said intensity output with the said threshold value so as to produce a threshold output only when the intensity output exceeds the threshold value.

5. A system according to claim 4, including
   third detecting means operative to produce a third signal dependent on the electromagnetic radiation received at a third wavelength band,
   comparing means connected to receive and compare the said second and third signal so as to produce a fire output only when the magnitude of one of the compared signals exceeds the magnitude of the other,
   the said third wavelength band being so selected that the fire output is produced when the source of radiation is a fire of a type to be detected and is not produced when the source of radiation is not such a fire, and
   means connected to receive the said threshold output and the said fire output and to produce an alarm signal only when the said threshold output and the said fire output simultaneously exist.

6. A system according to claim 1, including
   third detecting means operative to produce a third signal dependent on the electromagentic radiation received at a third wavelength band, and
   comparing means connected to receive and compare the said second and third signals so as to produce a fire output only when the magnitude of one of the compared signals exceeds the magnitude of the other,
   the said third wavelength band being so selected that the fire output is produced when the source of radiation is a fire of a type to be detected and is not produced when the source of radiation is not such a fire.

7. Sensing means for determining the position of a source of radiation, comprising
   two systems each for producing an output dependent on the distance to the source of radiation, each said system comprising first detecting means having a wide field of view and operative to produce a first signal dependent on the electromagnetic radiation emitted by the source and received in a first wavelength band at which the received radiation is significantly absorbed by the ambient atmosphere, second detecting means having a wide field of view and operative to produce a second signal dependent on the electromagnetic radiation emitted by the source and received in a second wavelength band which is a discrete emission band corresponding to a band in which the source emits radiation and in which there is relatively insignificant absorption by the ambient atmosphere, and comparing means connected to compare the first and second signals so as to produce a distance-dependent output,
   the two detecting means of one said system being spatially separated from the two detecting means of the other said system but capable of viewing the same source of radiation as the detecting means of the other system, and
   signal processing means connected to receive the said distance-dependent outputs from the two systems and for determining therefrom the approximate physical position of the source of radiation.

8. A method of measuring the distance to a localised source whose temperature is substantially in excess of its ambient atmosphere and which emits corresponding electromagnetic radiation, comprising the steps of
   measuring, using a wide field of view, the radiation received in first and second spaced apart narrow wavelength bands, the first of which encompasses a wavelength at which radiation from the said source is significantly absorbed by the ambient atmosphere and the second of which is a discrete emission band corresponding to a band in which the source emits radiation and which encompassing encompasses a wavelength at which there is insignificant such absorption, and measuring the ratio between the intensities of the radiation as respectively received in the first and second wavelength bands so as to produce a distance-dependent output dependent on the said distance.

9. A method according to claim 8, including the step of multiplying the signal dependent on the intensity received in the second wavelength band by a signal dependent on the square of the said ratio, so as to produce an intensity output dependent on the intensity of radiation as actually emitted by the source.

10. A method according to claim 9, including the steps of
establishing a predetermined threshold value, and
comparing the said intensity output with the predetermined threshold value so as to produce a threshold output only when the said intensity output exceeds the threshold value.

* * * * *